(12) United States Patent
Tseng et al.

(10) Patent No.: US 8,750,007 B2
(45) Date of Patent: Jun. 10, 2014

(54) POWER CONVERSION

(75) Inventors: Ryan Tseng, Coronado, CA (US); Pawan Kumar Tiwari, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 13/033,481

(22) Filed: Feb. 23, 2011

(65) Prior Publication Data

US 2011/0235380 A1    Sep. 29, 2011

Related U.S. Application Data

(60) Provisional application No. 61/316,725, filed on Mar. 23, 2010.

(51) Int. Cl.
*H02M 7/217*    (2006.01)

(52) U.S. Cl.
USPC ............. 363/127; 363/44; 363/84; 363/125

(58) Field of Classification Search
USPC ........... 323/239, 324; 363/34, 44, 45, 46, 48, 363/52, 84, 86, 125, 126, 127; 307/104, 307/149, 151
See application file for complete search history.

(56) References Cited

U.S. PATENT DOCUMENTS

| | | | |
|---|---|---|---|
| 4,412,277 A * | 10/1983 | Mitchell | 363/127 |
| 5,436,550 A * | 7/1995 | Arakawa | 323/222 |
| 5,818,708 A * | 10/1998 | Wong | 363/89 |
| 6,301,128 B1 | 10/2001 | Jang et al. | |
| 7,446,486 B2 * | 11/2008 | Steffie et al. | 315/291 |
| 8,278,784 B2 | 10/2012 | Cook et al. | |
| 2004/0136207 A1 | 7/2004 | Havanur | |
| 2006/0083038 A1 * | 4/2006 | Lynch | 363/127 |
| 2006/0267523 A1 | 11/2006 | Seelig et al. | |
| 2008/0013343 A1 * | 1/2008 | Matthews | 363/16 |
| 2008/0246445 A1 * | 10/2008 | Wrathall | 323/207 |

FOREIGN PATENT DOCUMENTS

WO        WO0118936           3/2001

OTHER PUBLICATIONS

International Search Report and Written Opinion—PCT/US2011/029462, ISA/EPO—Jun. 27, 2011.

* cited by examiner

*Primary Examiner* — Nguyen Tran
(74) *Attorney, Agent, or Firm* — Knobbe Martens Olson & Bear LLP

(57) ABSTRACT

Exemplary embodiments are directed to power conversion. A device may include a controllable switch coupled between an AC network and a DC network. The device may further include control circuitry configured to modify a configuration of the switch based on a detected difference between a reference signal and an output signal at the DC network.

25 Claims, 12 Drawing Sheets

POWER CONVERSION

CLAIM OR PRIORITY UNDER 35 U.S.C. §119

This application claims priority under 35 U.S.C. §119(e) to:

U.S. Provisional Patent Application 61/316,725 entitled "APPARATUS AND METHOD FOR POWER CONVERSION" filed on Mar. 23, 2010, the disclosure of which is hereby incorporated by reference in its entirety.

BACKGROUND

1. Field

The present invention relates generally to power conversion, and, more particularly, to an apparatus and method for converting an alternating power signal to a signal that may be used to power a direct current system.

2. Background

As will be appreciated by a person having ordinary skill in the art, electronic applications may require a conversion of an alternating current (AC) input to a direct current (DC) output. One example application may comprise wireless charging of a cellular telephone. A transmitter of the wireless power transfer system may use an AC power signal to wirelessly propagate power from a transmitter coil to a receiver coil. The receiver coil may be connected to circuitry configured to charge a battery of the cellular telephone. To do so, the AC power signal received by the receiver coil can be converted into a DC power signal that can be used to charge the battery. Often, conversion from an AC signal to a DC signal can include a number of sequential modifications to the input signal including rectification of the input signal and regulation of the rectified signal.

A need exists for methods, systems, and devices for enhanced power conversion from an AC signal to a DC signal.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
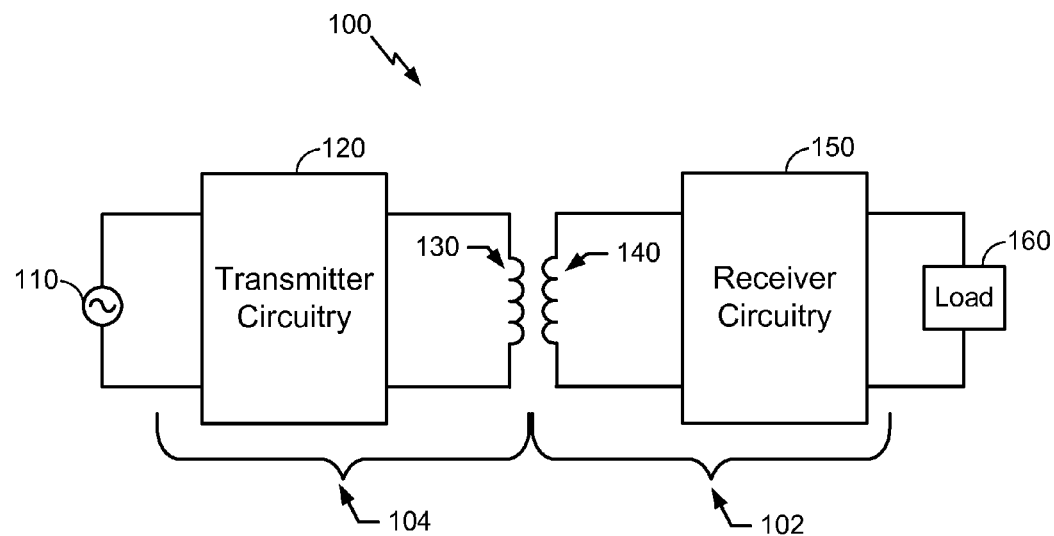
FIG. 1 is a schematic diagram of an example wireless power transfer system, in accordance with an exemplary embodiment of the present invention.

FIG. 1 illustrates a wireless power transfer system 100 configured for power conversion, according to various example embodiments of the present invention. Wireless power transfer system 100 may include a wireless power transmitter 101 and a wireless power receiver 102. By way of example only, wireless power transmitter 101 may be a constructed in the form of a pad or installed into furniture, such as, for example, a desktop. Wireless power transmitter 101 may include an input AC power source 110, transmitter circuitry 120, and a coil 130. AC power source 110 may be any type of apparatus that provides an AC power signal, such as, for example, a generator, an alternator, a 110 volt wall socket, or the like. Transmitter circuitry 120 may be configured to prepare an AC power signal provided by the AC power source 110 for wireless power transfer via coil 130. In some exemplary embodiments, wireless power transmitter 101 may comprise a plurality of coils 130. Coil 130 may be configured to couple (e.g., loosely couple) with a coil 140 of wireless power receiver 102 to facilitate wireless transmission of power from wireless power transmitter 101 to wireless power receiver 102.

Wireless power receiver 102 may be affixed to, or otherwise associated with, a load 160 that is to receive and utilize the power transferred from wireless power transmitter 101. Load 160 may comprise, for example, a mobile computing or communication device (e.g., a cellular phone, a smart phone, mobile computers, web-browsing devices, or the like), a battery to be charged, or any other type of electrical load. According to some exemplary embodiments, load 160 may be configured to be powered by a DC power signal to, for example, power load 160 or charge a battery that powers load 160.

Wireless power receiver 102 may include a coil 140 and receiver circuitry 150. Coil 140 may be configured to couple (e.g., loosely couple) to coil 130 of wireless power transmitter 101 to receive the power signal transmitted by wireless power transmitter 101. Via coil 130, an AC power signal may be induced in coil 140. In exemplary embodiments where the load 160 is configured to receive and be powered by a DC power signal, receiver circuitry 150 may be configured to convert an AC power signal provided by coil 140 to a DC power signal for use in powering load 160. In this regard, receiver circuitry 150 may be configured to convert the AC power signal received at coil 140 into a DC output signal. With respect to receiver circuitry 150, wireless power transmitter 101 and coil 140 may comprise an AC input network, and load 160 may comprise a DC output network.

For performing an AC to DC conversion, some exemplary embodiments of the present invention may utilize a controllable switch, such as a power field-effect transistor (FET). According to various exemplary embodiments, a single controllable switch may be utilized to perform the AC to DC conversion. The controllable switch may be implemented such that high power efficiency is realized and minimal components are required for an AC to DC conversion. As a result, a small form factor solution may also be realized. Further, some exemplary embodiments may not require output inductors, which often negatively effect power efficiency in small-form factor solutions.

Figure 2:
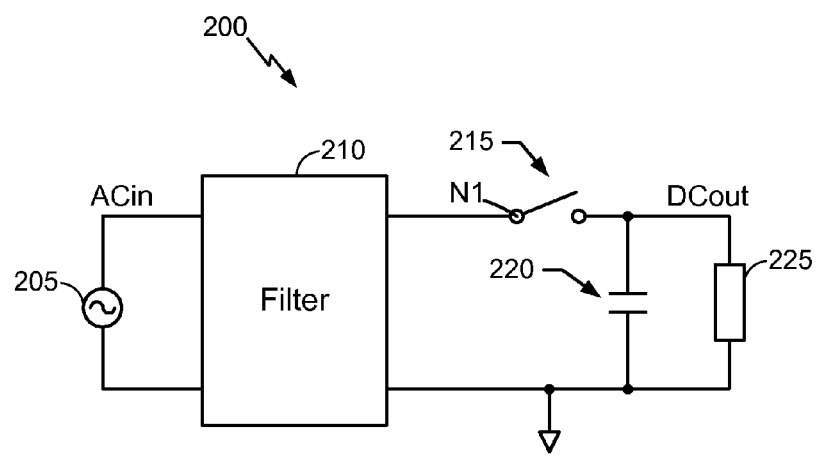
FIG. 2 is diagram of a circuit configured to perform a power conversion, according to an exemplary embodiment of the present invention.

FIG. 2 illustrates a circuit 200 configured to perform an AC to DC power conversion through implementation of a controllable switch, in accordance with an exemplary embodiment of the present invention. Circuit 200 includes an AC voltage source 205, an LC filter 210, a controllable switch 215, a capacitor 220, and a DC load 225. Controllable switch 215 may be controlled by a control signal (not depicted) which causes switch 215 to be in either a conducting state (i.e., ON) or a non-conducting state (i.e., OFF). The conduction state of switch 215 can be toggled in many different patterns to operate on the AC input signal as provided by the LC filter 210 to obtain a desired DC output voltage. According to various exemplary embodiments, the different patterns may include, for example only, a pattern wherein switch 215 is ON for a small duration within each AC cycle (i.e., a per cycle pattern), a pattern wherein switch 215 is ON for a small duration within some, but not all, AC cycles (i.e., a cycle skip pattern), or a pattern wherein switch 215 is ON for durations covering multiple AC cycles (i.e., cycle average pattern).

Figure 3:
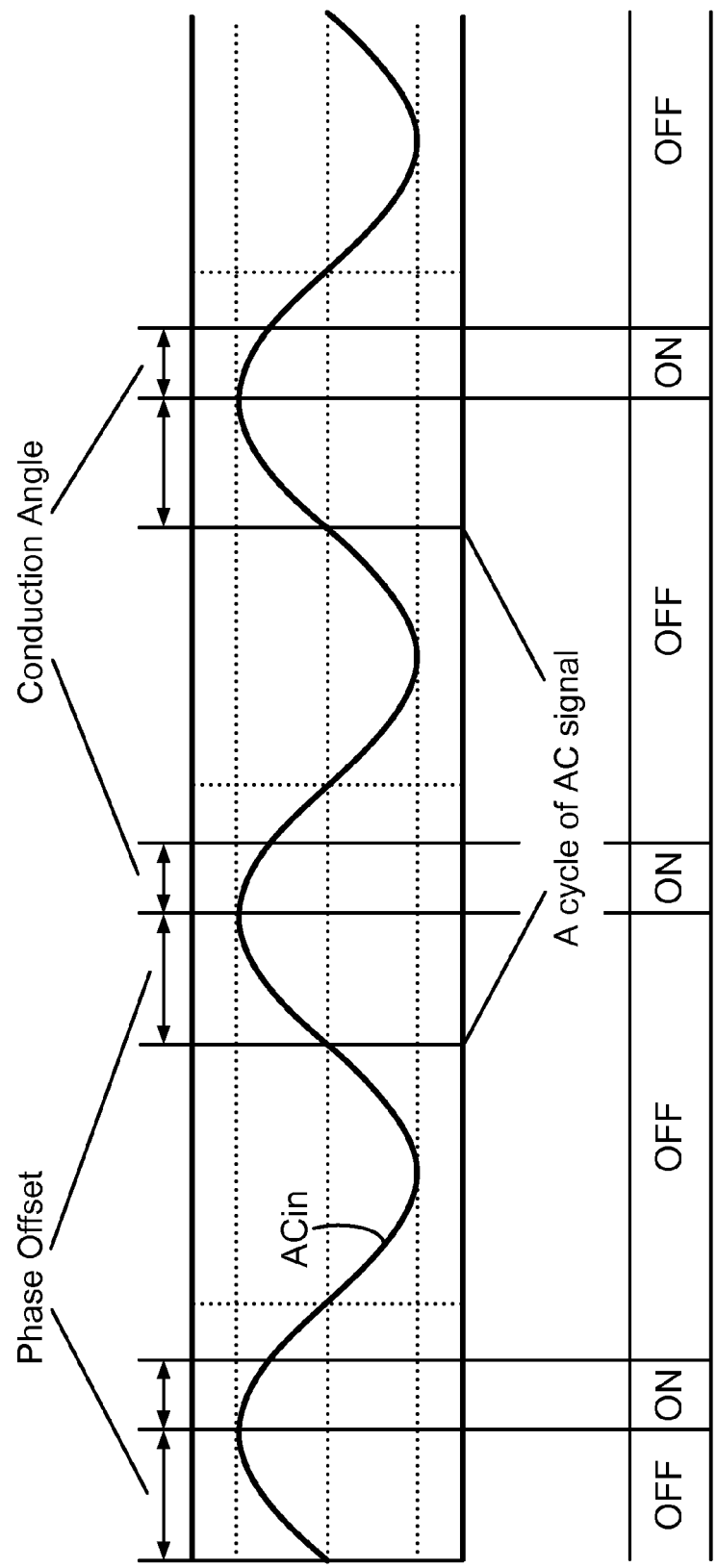
FIG. 3 is a timing diagram of an AC input signal and conduction states of a switch for performing power conversion, according to an exemplary embodiment of the present invention.

FIG. 3 is a graph of an implementation of an example per cycle pattern as applied to an AC input signal 226. FIG. 3 shows toggling of switch 215 (see FIG. 2) between ON and OFF states. Regardless of the pattern being implemented (e.g., the per cycle pattern, the cycle skip pattern, or the cycle average pattern), the timing of when switch 215 is ON and the duration that switch 215 remains ON can determine characteristics (e.g., the voltage or average voltage) of a DC output signal DCout.

A time when the switch 215 turns ON, relative to AC input signal 226, can be referred to as the phase offset. More specifically, the phase offset may be defined as the period of time that elapses after the beginning of a cycle, before switch 215 is turned ON. The phase offset may be described in units of time (e.g., seconds) or the phase offset may be described in units of degrees relative to AC input signal 226, where one cycle is 360 degrees. With respect to defining the phase offset in terms of degrees, the example per cycle pattern of FIG. 3 illustrates a 90 degree phase offset.

The duration over which switch 215 remains ON may be referred to as a conduction angle relative to AC input signal 226. More specifically, the conduction angel may be defined as the period of time that elapses after switch 215 is turned ON until switch 215 is turned OFF. The conduction angle may be described in units of time (e.g., seconds) or the conduction angle may be described in units of degrees relative to AC input signal 226. With respect to defining the conduction angle in terms of degrees, the example per cycle pattern of FIG. 3 illustrates a 45 degree conduction angle.

According to various exemplary embodiments, and as further described below, a feedback mechanism in the form of control circuitry may be implemented to adjust the phase offset, the conduction angle, or both to achieve a desired DC output signal. In this regard, FIG. 3 illustrates a phase offset and conduction angle that are associated with a given load to maintain a desired DC output signal.

Figure 4:
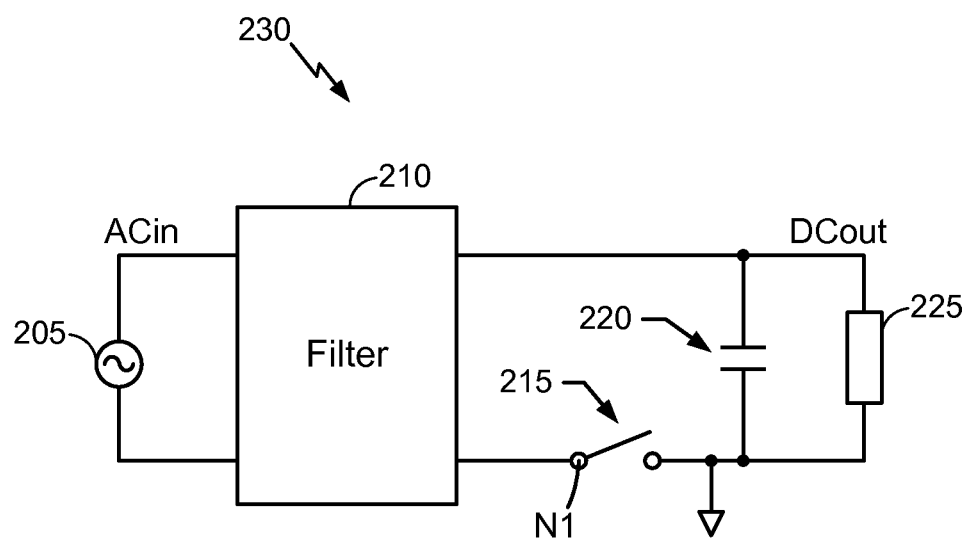
FIG. 4 is diagram of another circuit configured to perform a power conversion, according to an exemplary embodiment of the present invention.

FIG. 4 illustrates a circuit 230, according to another exemplary embodiment of the present invention. As illustrated in circuit 230, switch 215 is connected to and in communication with a grounded node of circuit 230. In this regard, comparing the configuration differences between FIG. 2 and FIG. 4, switch 215 may positioned on either the high side (not connect to a grounded node) or the low side (connected to a grounded node). The placement of switch 215 in this regard, need not change the resultant functionality of the circuits. According to various exemplary embodiments, placing switch 215 on the low side may be preferable, because an NMOS (n-type metal-oxide-semiconductor) may be utilized as switch 215, which may have a lower resistance (and improved power efficiency) when switch 215 is ON, relative to a PMOS (n-type metal-oxide-semiconductor) which may be used as switch 215 when the switch is positioned on the high side. In this regard, connecting an NMOS on the high side may require further circuitry to implement (e.g., overhead circuits such as charge pumps) because the NMOS requires a positive voltage with respect to the source voltage at the gate terminal to turn the transistor ON.

LC filter 210 of FIGS. 2 and 4 may facilitate the operation of switch 215 to generate DC output signal DCout. Through modifications to LC filter 210 to form a matching network, circuits 200 and 230 may be configured for use with any AC input network. LC filter 210 can operate to at least partially isolate the input terminal of switch 215 (i.e., node N1) from AC voltage source 205. By isolating switch 215 in this manner, LC filter 210 can assist in improving the efficiency of circuits 200 and 230. In this regard, when switch 215 is ON, switch 215 may force the voltage at node N1 to be nearly equal the output voltage level (DCout), thereby reducing the losses, since the losses may be proportional to the voltage drop across switch 215.

Figure 5A:
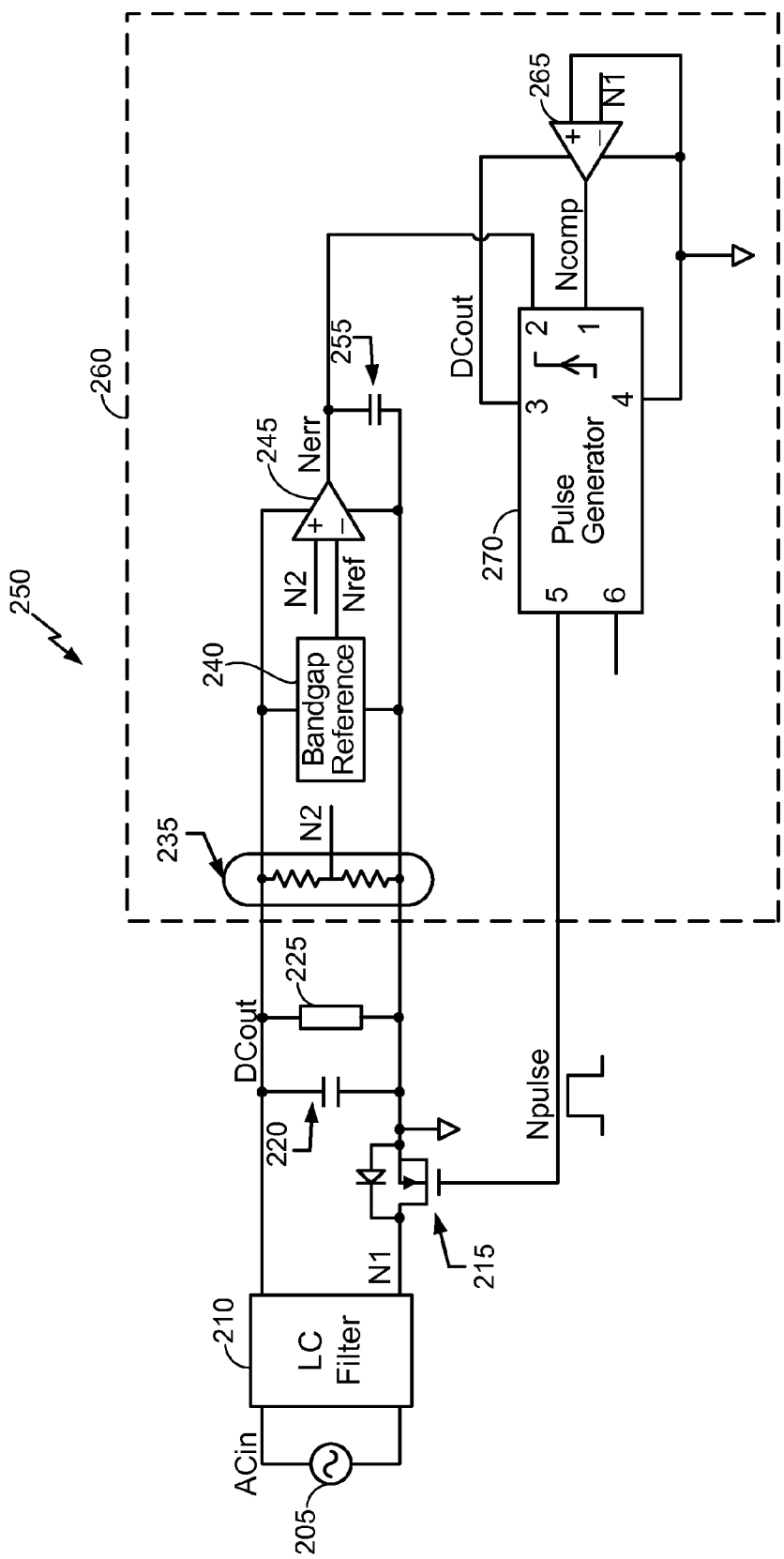
FIG. 5A is diagram of a circuit configured to perform a power conversion with switch control circuitry, in accordance with an exemplary embodiment of the present invention.

FIG. 5A illustrates the exemplary embodiment of FIG. 4 in the form of a circuit 250 wherein switch 215 comprises an NMOS transistor, and circuit 250 additionally includes control circuitry 260 for controlling switch 215. Control circuitry 260 may be configured to modify an associated conductive angle to cause switch 215 to generate a desired DC output signal via a feedback mechanism. In this regard, control circuitry 260 is configured to sense a difference between the current output signal (i.e., DCout) and a desired output signal. The difference between the current output signal and the desired output signal (e.g., reference signal) may be referred to as an error. Control circuitry 260 is configured to modify the control signal that controls switch 215, which in turn modifies the output signal so as to reduce the error.

Control circuitry 260 may include a configurable voltage divider 235, a bandgap reference circuit 240, an error amplifier 245, a capacitor 255, a comparator 265, and a pulse generator 270. With respect to the operation of the control circuitry 260, an error signal at node Nerr may be generated by error amplifier 245. Error amplifier 245 may have input nodes N2 and Nref. A signal at node N2 may comprise a representation of a signal at output voltage DCout via configurable voltage divider 235. In this regard, node N2 may be created by a programmable resistive voltage divider connected to output voltage DCout. The programmable voltage divider may be used to provide the desired output voltage value for comparison in error amplifier 245. Node Nref may provide a reference signal to error amplifier 245. The reference signal may be generated by bandgap reference circuit 240, which may comprise a circuit that creates an output voltage level, for example 1.2 volts, as long as a supply voltage of bandgap reference circuit 240 is greater than a threshold value. As such, the output voltage level of bandgap reference circuit 240 may remain relatively constant, despite changes in supply voltage, temperature, and other process variations. Error amplifier 245 may be configured to perform a comparison of the signal at node N2 with the reference signal at node Nref to determine a difference between the representation of the signal at output voltage DCout and the reference signal, and thereby determine the error.

The control signal for controlling switch 215 (i.e., the signal driving the gate of the NMOS) at node Npulse may be correlated to the value of the error signal at node Nerr and the state of comparator 265 at node Ncomp. It is noted that node N1, which is coupled to a terminal of switch 215, is also coupled to an input of a comparator 265. The comparator 265 may be configured to compare the signal at node N1 with a local ground voltage (e.g., 0 volts) and generate a high output state when the signal at node N1 falls below the ground voltage (since the switch 215 is connected on the low side). Comparator 265 can operate to control the phase offset of the conduction angles of switch 215. In this regard, the voltage difference between node N1 and ground can be the voltage difference across the source and drain terminals of switch 215, which are the inputs to comparator 265. Since a pin 1 of pulse generator 270 is configured to permit a pulse at the output pin (e.g., pin 1 operates as an enable pin), the signal at Npulse (i.e., the signal at output pin 5), according to some exemplary embodiments, will only allow the conduction state of switch 215 to transition to ON, when there is no voltage across the source and drain terminals of switch 215. As a result, the energy efficiency of switching can be increased, and zero voltage state (e.g., zero voltage across the source and the drain) may be realized. Accordingly, when the output of comparator 265 goes high, switch 215 may be latched to the ON state. Switch 215 may be turned to the OFF state after a controlled delay. The magnitude of the delay may increase proportionally to an increase in error signal at node Nerr. As a result, the conduction angle defined by the control signal at node Npulse may be modulated based on error signal via pulse generator 270 when the output of the comparator is high. Therefore, the pulse width of the signal at node Npulse may accordingly increase or decrease in response to respective increases or decreases in the signal at node Nerr.

With respect to the operation of the example pulse generator 270, the pin functionality may be as follows. Pulse generator 270 may generate a pulse output when pin 1 is high. Pin 2 may provide pulse width control. Pins 3 and 4 may be a supply voltage and a ground level voltage, respectively. Pin 5 provides the pulse output, and pin 6 is configured to disable the pulse generator 270 based on its value.

The control circuitry of FIG. 5A is configured to use what may be referred to as a positive polarity scheme for modifying the control signal and ultimately the conduction angle. In this regard, a positive polarity scheme is one where, as the error increases (i.e., the difference between the representation of the output signal and the reference signal increases), the conduction angle also increases. Stated another way, reducing the conduction angle increases DC output voltage DCout, and increasing the conduction angle may decrease DC output voltage DCout. Accordingly, if DC output voltage DCout were to increase beyond the desired level causing the error to increase, the conduction angle would increase to bring DC output voltage DCout down. For each cycle, this process can be repeated to reduce the voltage incrementally until DC output voltage DCout reaches the desired output voltage level. Accordingly, to modify the control signal at node Npulse and achieve a desired DC output voltage, control circuitry 260 may be configured to modify the control signal to cause switch 215 to be in the conducting state when an AC input voltage across the AC input network is greater than an output voltage of the output signal, and a voltage of the representation of the output signal is less than a voltage of the reference signal. Similarly, control circuitry 260 may be configured to modify the control signal to cause switch 215 to be in the conducting state when an AC input voltage across the AC input network is less than a output voltage of the output signal, and a voltage of the representation of the output signal is greater than a voltage of the reference signal. In this manner, the DC output voltage DCout can be regulated via operation of switch 215 regardless of the effects of load 225.

Figure 5B:
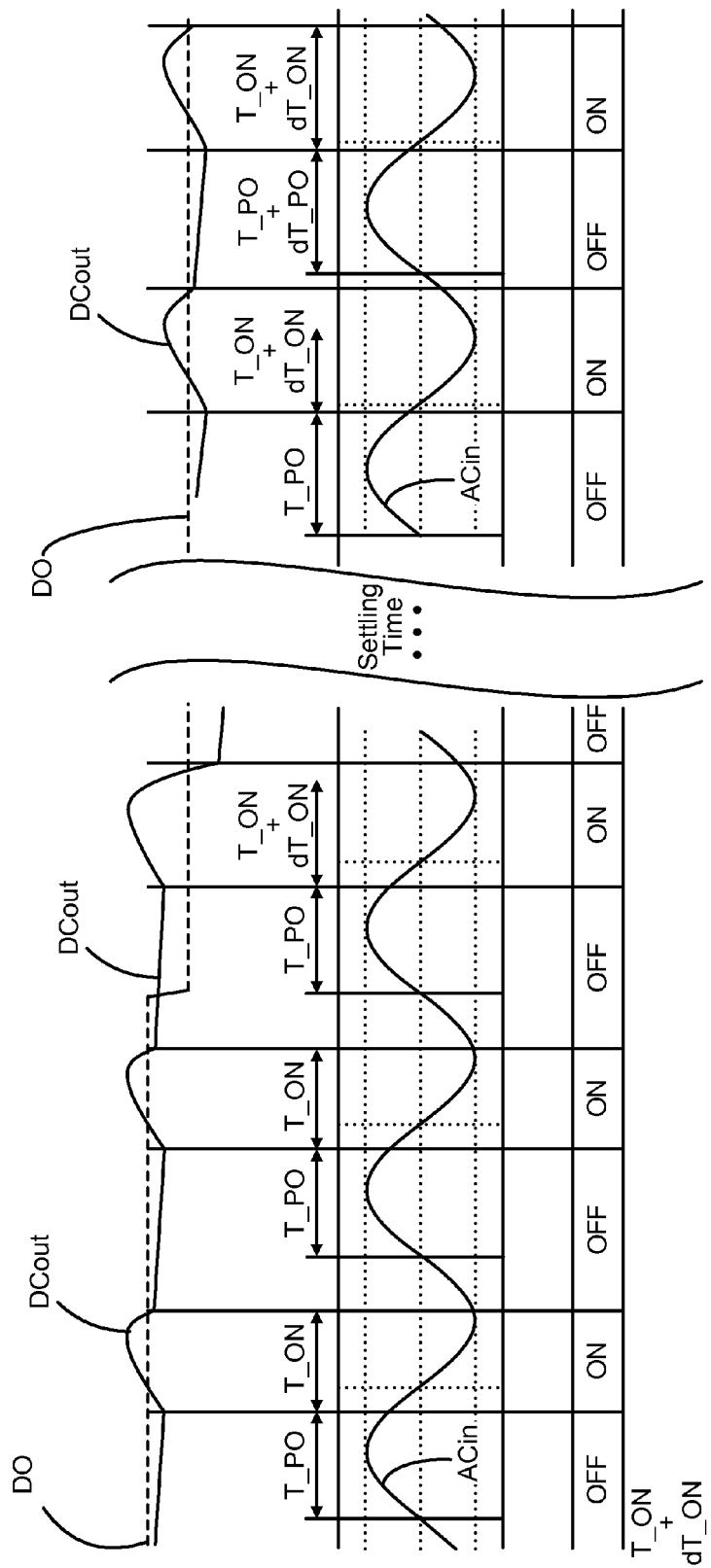
FIG. 5B is another timing diagram of an AC input signal that also includes a representation of a DC output, in accordance with an exemplary embodiment of the present invention.

FIG. 5B illustrates a timing diagram of AC input signal ACin and a DC output signal DCout in accordance with various exemplary embodiments of the present invention. FIG. 5B illustrates a desired output level DO, DC output signal DCout, AC input signal ACin, and the resultant conduction states of the switch 215, for the operation of, for example, the circuitry of FIG. 5A. "T_ON" represents a conduction period and "T_PO" represents a phase offset, as described above. Furthermore, "T_ON+dT_ON" represents a modified conduction period and "T_PO+dT_PO represents a modified phase offset." The controlled operation of switch 215 as indicated by the first two "ON" conduction states, illustrates how the switch 215 and the supporting circuitry operates to generate a substantially constant voltage level DCout about desired output level DO.

At point 505, a change in desired voltage level DO occurs. The response to this change is similar to how modifications to the conduction angle and the phase offset would be implemented to maintain a desired output level if AC input signal ACin and DC output signal DCout were to drift or otherwise change, requiring a responsive correction to maintain a desired voltage level. Note that after the change in the desired voltage level at point 505 to reduce the desired voltage level, the conduction angle is increased via the feedback capabilities of control circuitry 260 from being T_ON to T_ON+ dT_ON. As mentioned above, since a reduction in DC output signal DCout is desired, the conduction angle is increased, due to the positive polarity scheme. The error signal has increased as a result of the change in the desired output level (e.g., the reference voltage), and the conduction angle is responsively increased. After a settling time, the operation of switch 215 may continue in a similar manner to the first two ON durations, however, now optimized to support the lower voltage level.

In some exemplary embodiments, control circuitry 260 may also be configured to cause switch 215 to transition between conducting states (e.g., ON to OFF or OFF to ON)

when the voltage across the terminals of switch 215 is zero volts or substantially zero volts. In the regard, according to some exemplary embodiments when switch 215 is a FET, control circuitry 260 may be configured to cause conducting state transitions when the voltage between the source and the drain terminals of the FET is zero or substantially zero. Causing switching in this manner may enable a power savings function, particularly when switch 215 is transitioning from a non-conducting state to a conducting state. By performing zero voltage switching across the FET, according to various exemplary embodiments, switching losses can be reduced or eliminated.

FIG. 5A illustrates one exemplary embodiment for implementing the functionality of control circuitry for modifying the control signal in response to feedback to reduce the error in the output signal. In this regard, circuitry to modify the control signal may be configured to modify the phase offset, the conduction angle, or both to generate a desired DC output signal. This functionality may be implemented in a number of ways including via a specially configured processor, which ay be configured via the execution of software instructions retrieved from a memory, or via a hardware configured processor such as an application specific integrated circuit (ASIC), field programmable gate array (FPGA), or the like. In this regard, according to an exemplary embodiment, a processor configured in this manner may replace the control circuitry 260 by monitoring the signal at DCout and generating or modifying a control signal at node Npulse.

Figure 6:
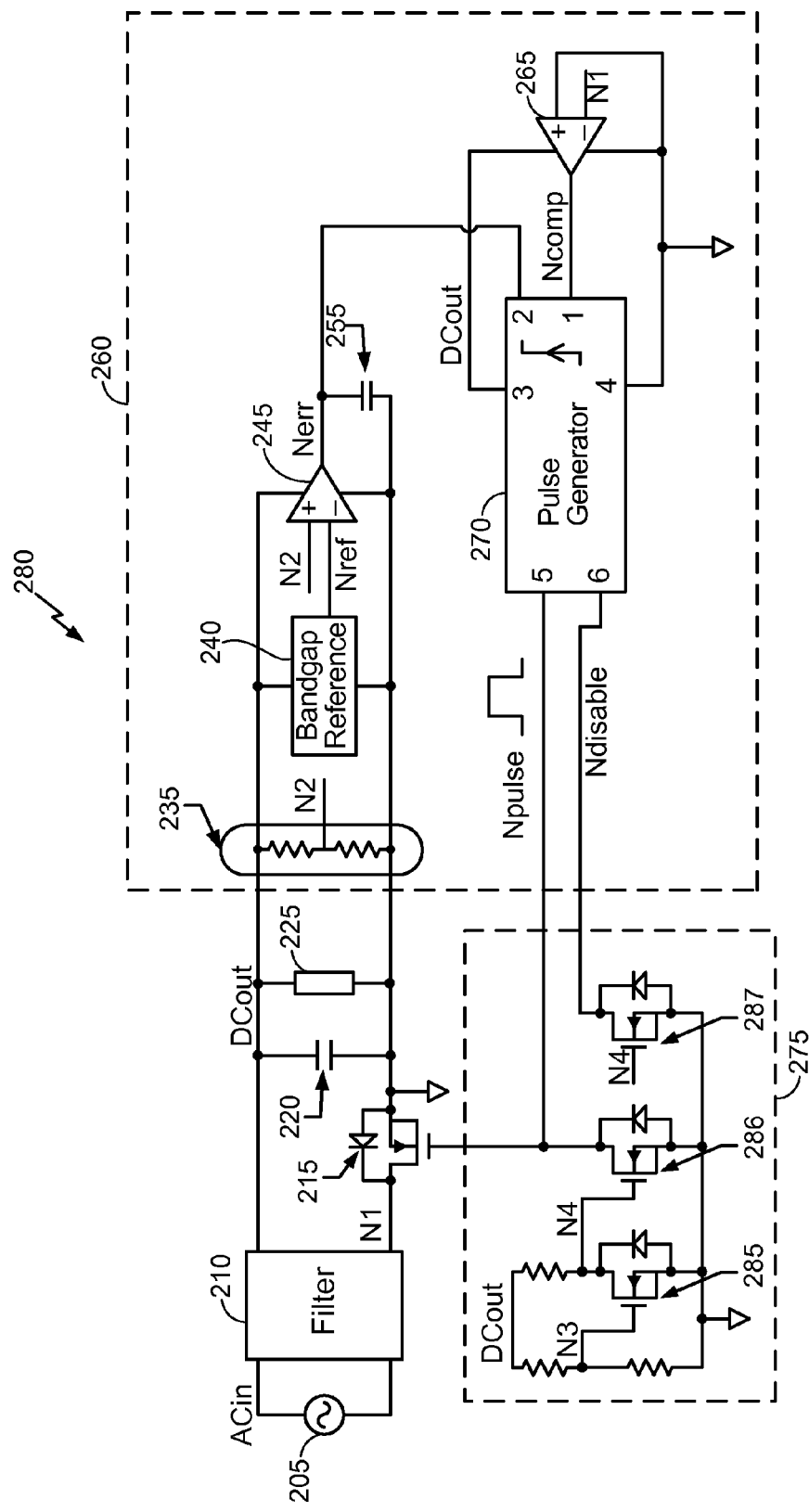
FIG. 6 is diagram of a circuit configured to perform a power conversion with switch control circuitry and a startup circuit, in accordance with an exemplary embodiment of the present invention.

FIG. 6 illustrates an exemplary embodiment of FIG. 5A in the form of a circuit 280 with the addition of a startup circuit 275. As mentioned above with respect to the operation of a wireless power transfer system, the AC input signal indicated by AC voltage source 205 may, in some exemplary embodiments, be a receive coil within a wireless power receiver. When the receive coil in not coupled to a transmit coil of a wire power transmitter, an AC input signal, which would otherwise provide power the components of the circuit, may not be present and the circuitry to support the conversion to a DC output signal may not be energized when the system is inactive. As a result, the DC output voltage may drop to 0V or a voltage that cannot support the proper operation of the components. Subsequently, when the system becomes active (e.g., the wireless power receivers come into proximity with a wireless power transmitter such that coupling occurs), a delay may occur as the DC output voltage rises from the inactive level (e.g., 0 volts). In some instances, the DC output voltage may not rise to a level where the components begin to operate properly. As a result, some example embodiments may include startup circuit 275.

With respect to the operation of startup circuit 275, the signal on node Npulse may clamp switch 215 to an OFF state, thereby effectively deactivating control circuitry 260. In response, the DC output voltage DCout may rise due to, for example, a body diode of switch 215 (when embodied as a FET) or an external diode in parallel with switch 215. When output voltage DCout reaches a threshold level, control circuitry 260 may be activated via node Ndisable, and the operation of the control circuitry 260 may cause the DC output voltage DCout to be controlled as described above.

Figure 7:
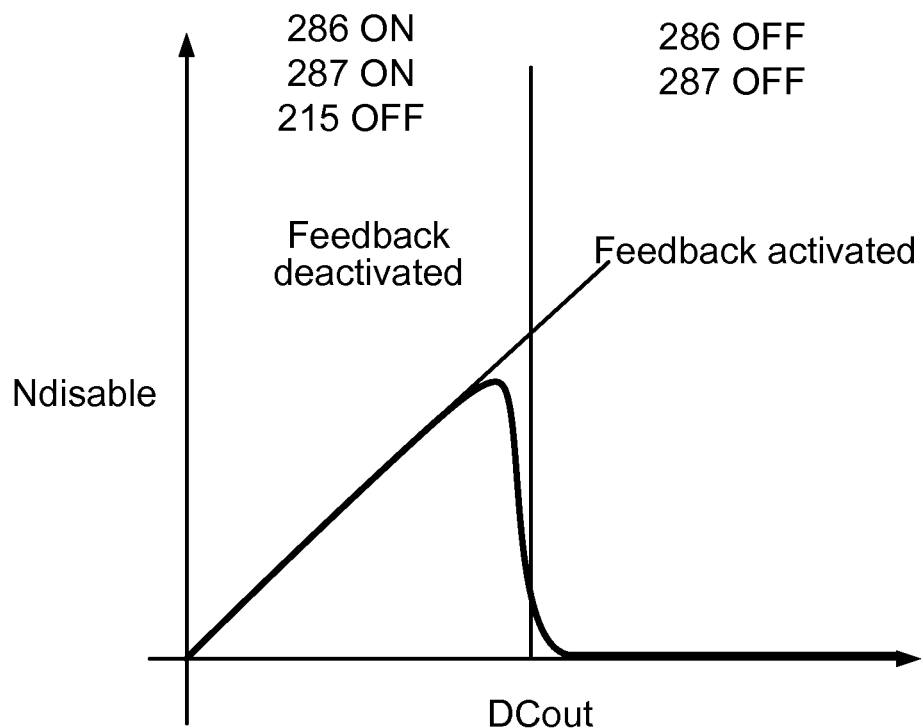
FIG. 7 is a graph of a pulse generator disable signal relative to a DC output signal for control circuitry activation, according to an exemplary embodiment of the present invention.

FIG. 7 is a graph of the operation of startup circuit 275 with respect to the signal generated at node Ndisable relative to output voltage DCout. As indicated in the graph, in an initial phase of circuit startup (i.e., when DCout is low), transistors 286 and 287 are ON forcing switch 215 to be OFF, thereby deactivating the control circuitry 260 in the feedback deactivated region of the graph. When DCout rises to and crosses a predefined threshold, transistors 286 and 287 turn OFF, thereby activating the control circuitry 260 through the signal provided at node Ndisable, as indicated in the feedback activated region of the graph. The predetermined threshold may be defined by the voltage divider that outputs to node N3 and drives the gate terminal of the transistor 285.

Figure 8A:
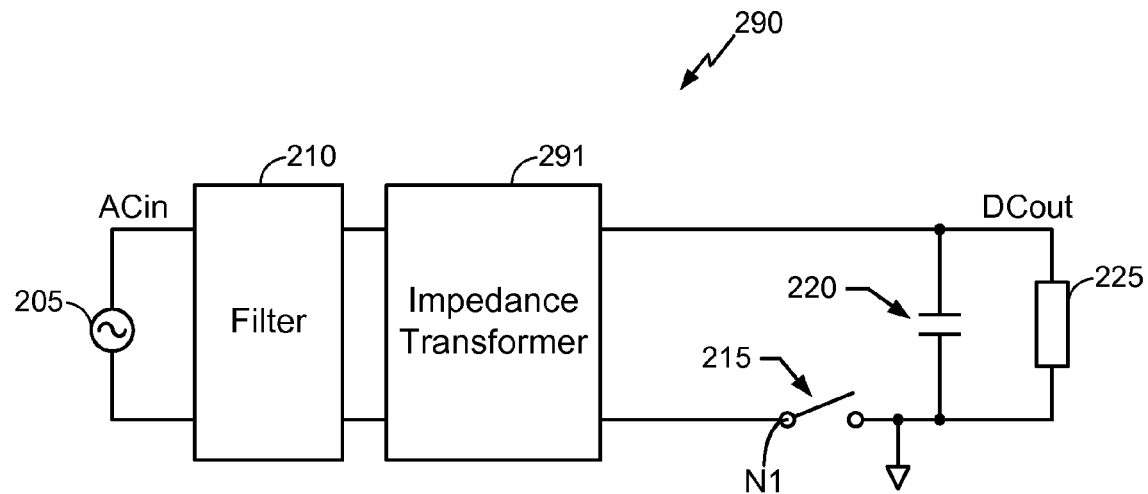
FIG. 8A is diagram of a circuit configured to perform a power conversion with an impedance transformer, in accordance with an exemplary embodiment of the present invention.
Figure 8B:
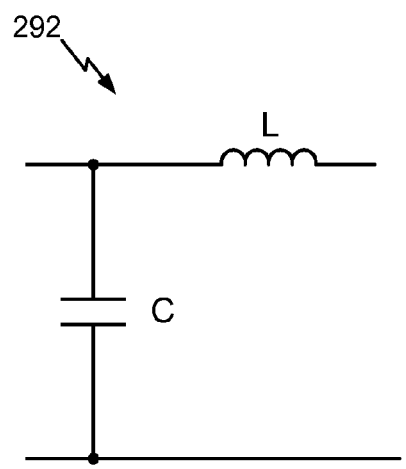
FIG. 8B is diagram of a LC network for use as an impedance transformer, according to an exemplary embodiment of the present invention.

FIG. 8 illustrates the exemplary embodiment of FIG. 4 in the form of a circuit 290 with the addition of an impedance transformer 291. Impedance transformer 291 may be configured to operate as a load matching network that can be used to increase the power transferred from AC network to output. According to some exemplary embodiments, impedance transformer 291 may comprise an LC network. To achieve maximum power transfer to load 225, the impedance of circuit 290 may be optimized to match load 225 through selection of the components to match the impedance of load 225. In this regard, since the impedance of load 225 may not be constant, the impedance contribution of impedance transformer 291 may be selected such that the impedance contribution of impedance transformer 291 maximizes the frequency of a match given the changing impedance of load 225, based on a statistical analysis of the impedance changes in the load. FIG. 8b illustrates an example LC circuit 292 that may be implemented as the impedance transformer 291.

Figure 9:
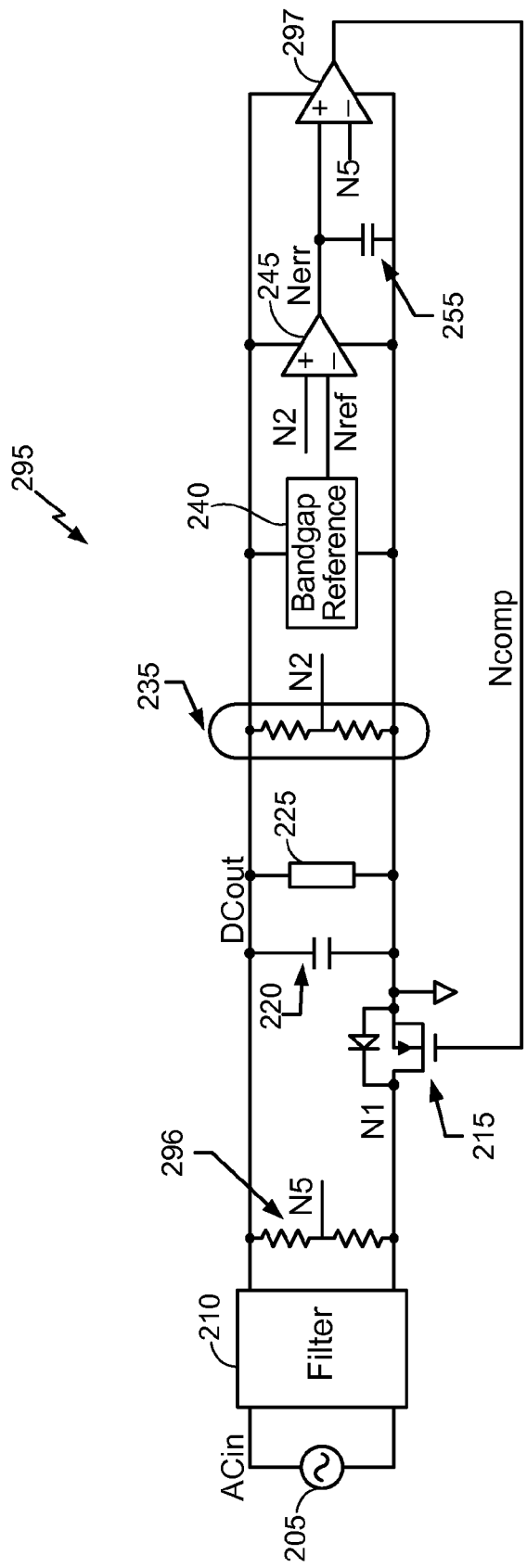
FIG. 9 is diagram of a circuit configured to perform a power conversion with an alternative configuration for switch control circuitry, in accordance with an exemplary embodiment of the present invention.

FIG. 9 illustrates an alternative example embodiment to the circuit 250 of FIG. 5A depicted as circuit 295. In this regard, the control circuitry for controlling switch 215 alternatively includes a voltage divider 296 and a comparator 297. The voltage across the AC input network, as indicated at a node N5 of voltage divider 296, can be used to determine the conduction angle for switch 215. With reference to circuit 250 of FIG. 5A, pulse generator 270 may be replaced by comparator 297. The inputs to comparator 297 may be the node Nerr and node N5. Circuit 295 may operate by modifying both the phase offset and conduction angle of switch 215 in response to variations in the error signal.

Figure 10:
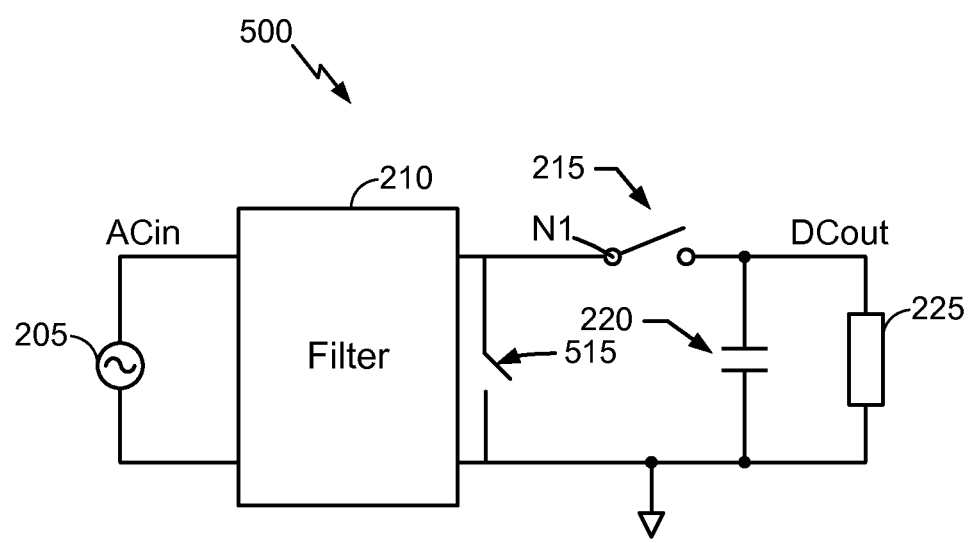
FIG. 10 is diagram of another circuit configured to perform a power conversion, according to an exemplary embodiment of the present invention.

FIG. 10 illustrates a circuit 500 configured to perform an AC to DC power conversion through implementation of a controllable switch, according to another exemplary embodiment of the present invention. Similar to circuit 200 of FIG. 2, circuit 500 includes AC voltage source 205, LC filter 210, controllable switch 215, capacitor 220, and DC load 225. Furthermore, circuit 500 includes another switch 515 coupled in shunt with LC filter 210. It is noted that in an exemplary embodiment wherein LC filter 210 includes a capacitor that is in series with switch 215, switch 515 may be necessary for proper operation of circuit 500. It is further noted that during operation of circuit 500, when switch 215 is in a closed configuration (i.e., ON or conducting state), switch 515 is in an open configuration (i.e., OFF or non-conducting state). Similarly, when switch 215 is in an open configuration (i.e., OFF or non-conducting state), switch 515 is in a closed configuration (i.e., ON or conducting state).

Figure 11:
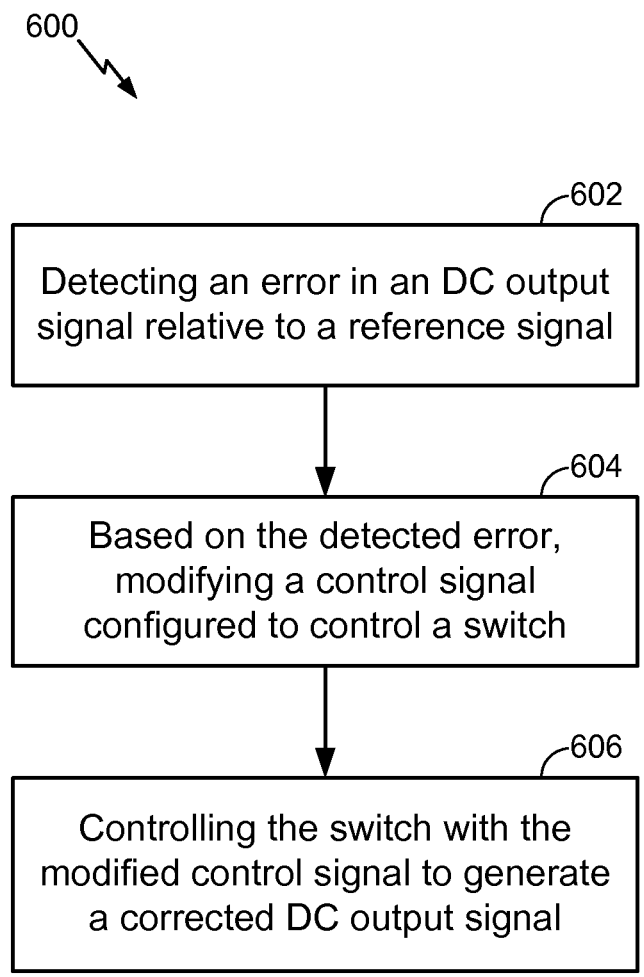
FIG. 11 is a flowchart illustrating a method, in accordance with an exemplary embodiment of the present invention.

FIG. 11 illustrates an example method 600 of the present invention. The operations of the method may be performed by a variety of electronic hardware devices including but not limited to the circuits illustrated in FIGS. 2, 4-6, and 8-10, a specially configured processor, which may be configured via the execution of software instructions for implementing the operation retrieved from a memory that stores the software instructions, or a hardware configured processor such as an application specific integrated circuit (ASIC), field programmable gate array (FPGA), or the like.

According to various example embodiments, method 600 for converting an AC input signal to a DC output signal may include detecting an error in a DC output signal relative to a reference signal (indicated by reference numeral 602). In this regard, control circuitry may be configured to detect a difference or error between a reference signal and a representation of an output signal generated by a switch in communication between an AC input network and a DC output network. Further, method 600 may include, based on the detected error, modifying a control signal configured to control a switch (indicated by reference numeral 604). The control signal may be modified or generated based on the detected difference or error to operate the switch in accordance with a conduction angle, a phase offset, or both relative to an AC input signal, and thereby provide a desired output signal to the DC output network. Method 600 may also include controlling the switch with the modified or generated control signal to generate a corrected DC output signal (indicated by reference numeral 606). The switch may be controlled by the control signal to cause the switch to transition between a conducting state and a non-conducting state based on the conduction angle, the phase offset, or both as indicated by the control signal.

In various exemplary embodiments, a method (e.g., method 600) may further comprise modifying the control signal to cause the switch be in the conducting state when an AC input voltage across the AC input network is greater than a output voltage of the output signal, and a voltage of the representation of the output signal is less than a voltage of the reference signal. Further, a method may further comprise modifying the control signal to cause the switch be in the conducting state when an AC input voltage across the AC input network is less than a output voltage of the output signal, and a voltage of the representation of the output signal is greater than a voltage of the reference signal.

In accordance with exemplary embodiments described herein, a single power FET may be controlled, via a control signal, to facilitate a conversion of an AC input signal to a DC. According to some exemplary embodiments, the control signal may drive the gate of a single power FET, and expend the energy to drive the gate of the single FET, to perform the conversion. Implementation of a single power FET, according to various exemplary embodiments, may result reduced power consumption to perform signal rectification and regulation.

Figure 12:
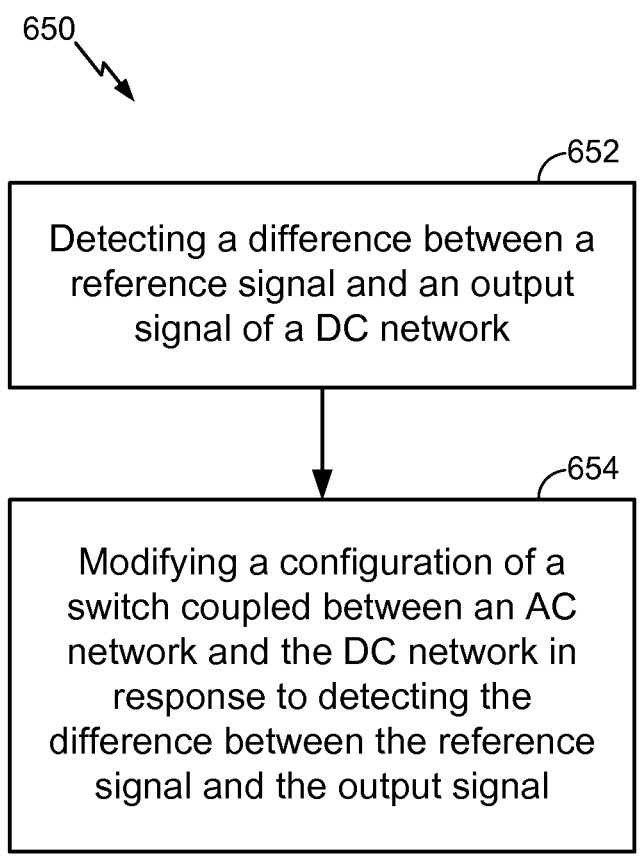
FIG. 12 is a flowchart illustrating another method, according to an exemplary embodiment of the present invention.

FIG. 12 is a flowchart illustrating another method 650, in accordance with one or more exemplary embodiments. Method 650 may include detecting a difference between a reference signal and an output signal of a DC network (depicted by numeral 652). Method 650 may further include modifying a configuration of a switch coupled between an AC network and the DC network in response to detecting the difference between the reference signal and the output signal (depicted by numeral 654).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
a controllable switch coupled between an AC network and a DC network, wherein the controllable switch is configured to perform AC to DC conversion; and
control circuitry configured to modify a configuration of the switch based on a detected difference between a reference signal and an output signal of the DC network, wherein the control circuitry is configured to modify the configuration by one of (a) increasing a phase offset of the switch defined as a period of time that elapses before the switch turns on relative to a beginning of a cycle of an input signal of the AC network and (b) decreasing the phase offset of the switch relative to the beginning of a cycle of the input signal.

2. The device of claim 1, the control circuitry configured to modify the configuration of the switch to one of increase a conduction angle of the switch relative to an input signal of the AC network and decrease the conduction angle of the switch relative to the input signal.

3. The device of claim 1, the control circuitry configured to modify the configuration of the switch to one of increase a voltage of the output signal and decrease the voltage of the output signal.

4. The device of claim 1, the control circuitry configured to modify the configuration of the switch with at least one control signal.

5. The device of claim 1, the control circuitry configured to cause the switch to be in a conducting state when an input voltage across the AC network is greater than a voltage of the output signal and a voltage the output signal is less than a voltage of the reference signal.

6. The device of claim 1, the control circuitry configured to cause the switch to be in the conducting state when an input voltage across the AC network is less than a voltage of the output signal and the voltage of the output signal is greater than a voltage of the reference signal.

7. The device of claim 1, the control circuitry further configured to modify a configuration of the switch when a voltage across the switch is substantially zero.

8. The device claim 1, further comprising an LC network at an input of the switch, the LC network comprising a matching network for modifying an impedance from the AC network into the DC network.

9. The device of claim 1, further comprising a second switch coupled in shunt between the AC network and the switch.

10. The device of claim 1, comprising a wireless power receiver.

11. The device of claim 1, further comprising start-up circuitry configured to one of activate the control circuitry and deactivate the control circuitry.

12. A method, comprising:
detecting a difference between a reference signal and an output signal of a DC network; and
modifying a configuration of a switch coupled between an AC network and the DC network in response to detecting the difference between the reference signal and the output signal; wherein the switch is configured to perform AC to DC conversion, wherein modifying comprises one of (a) increasing a phase offset of the switch defined as a period of time that elapses before the switch turns on relative to a beginning of a cycle of an input signal of the AC network and (b) decreasing the phase offset of the switch relative to the beginning of a cycle of the input signal.

13. The method of claim 12, the detecting comprising detecting a difference between a desired output signal and the output signal.

14. The method of claim 12, the modifying comprising causing the switch to transition from one of a non-conductive state to a conductive state and the non-conductive state to the conductive state.

15. The method of claim 12, the modifying comprising modifying the configuration of the switch to one of increase a conduction angle of the switch relative to an input signal of the AC network and decrease the conduction angle of the switch relative to the input signal.

16. The method of claim 12, the modifying comprising modifying the configuration of the switch to one of increase a voltage of the output signal and decrease the voltage of the output signal.

17. The method of claim 12, further comprising wirelessly receiver power at a receiver of the AC network.

18. The method of claim 12, further comprising modifying an impedance from the AC network into the DC network.

19. The method of claim 12, further comprising one of activating the control circuit and deactivating the control circuitry with a start-up circuit coupled thereto.

20. A device, comprising:
means for detecting a difference between a reference signal and an output signal of a DC network; and
means for modifying a configuration of a switch coupled between an AC network and the DC network in response to detecting the difference between the reference signal and the output signal, wherein the switch is configured to perform AC to DC conversion, wherein the means for modifying comprises means for modifying the configuration by one of (a) increasing a phase offset of the switch defined as a period of time that elapses before the switch turns on relative to a beginning of a cycle of an input signal of the AC network and (b) decreasing the phase offset of the switch relative to the beginning of a cycle of the input signal.

21. The device of claim 20, the means for modifying comprising means for modifying the configuration of the switch to one of increase a conduction angle of the switch relative to an input signal of the AC network and decrease the conduction angle of the switch relative to the input signal.

22. The device of claim 20, the means for modifying comprising means for modifying the configuration of the switch to one of increase a voltage of the output signal and decrease the voltage of the output signal.

23. The device of claim 1, the controllable switch being connected to and in communication with a grounded node.

24. The method of claim 12, the switch being connected to and in communication with a grounded node.

25. The device of claim 20, the switch being connected to and in communication with a grounded node.

* * * * *

UNITED STATES PATENT AND TRADEMARK OFFICE
CERTIFICATE OF CORRECTION

| | |
|---|---|
| PATENT NO. | : 8,750,007 B2 |
| APPLICATION NO. | : 13/033481 |
| DATED | : June 10, 2014 |
| INVENTOR(S) | : Ryan Tseng et al. |

It is certified that error appears in the above-identified patent and that said Letters Patent is hereby corrected as shown below:

In the Specification

In column 7 at line 20, Change "ay" to --may--.

In the Claims

In column 11 at line 46, In Claim 5, after "voltage" insert --of--.

In column 11 at line 56, In Claim 8, after "device" insert --of--.

Signed and Sealed this
Seventeenth Day of February, 2015

Michelle K. Lee
*Deputy Director of the United States Patent and Trademark Office*